United States Patent
Myong et al.

(10) Patent No.: US 11,729,597 B2
(45) Date of Patent: Aug. 15, 2023

(54) DIGITAL TWIN DISASTER MANAGEMENT SYSTEM CUSTOMIZED FOR UNDERGROUND PUBLIC AREAS

(71) Applicant: ELECTRONICS AND TELECOMMUNICATIONS RESEARCH INSTITUTE, Daejeon (KR)

(72) Inventors: Seung Il Myong, Daejeon (KR); Woo Sug Jung, Daejeon (KR); Mi Suk Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/534,563

(22) Filed: Nov. 24, 2021

(65) Prior Publication Data

US 2022/0167142 A1    May 26, 2022

(30) Foreign Application Priority Data

Nov. 24, 2020   (KR) .................. 10-2020-0158723
Aug. 3, 2021    (KR) .................. 10-2021-0102082

(51) Int. Cl.
*H04W 4/90* (2018.01)
*H04W 4/38* (2018.01)
(Continued)

(52) U.S. Cl.
CPC ............. *H04W 4/90* (2018.02); *G06T 19/003* (2013.01); *H04W 4/38* (2018.02); *H04W 4/80* (2018.02)

(58) Field of Classification Search
CPC ........ H04W 4/90; H04W 84/18; H04W 4/38; H04M 1/72418; H04M 1/72421;
(Continued)

(56) References Cited

U.S. PATENT DOCUMENTS 10,225,723 B1    3/2019  Son
2015/0312645 A1  10/2015 Lee et al.
(Continued)

FOREIGN PATENT DOCUMENTS

KR     10-1989982 B1    6/2019
KR     10-2019-0109068 A   9/2019
KR     10-2192028 B1    12/2020

*Primary Examiner* — Maria El-Zoobi
(74) *Attorney, Agent, or Firm* — Lrk Patent Law Firm

(57) ABSTRACT

Provided is a digital twin disaster management system customized to keep safety for urban underground tunnels, including: a sensor sub-system configured to detect environmental information, status information and image information in the urban underground tunnels; a digital twin model management sub-system configured to create and update a virtual space corresponding to the urban underground tunnels using information provided from the sensor sub-system and 3D space, insert various types of attributes into the virtual space, detect tagging information, predict the spread of each disaster, and infer a degree of risk of a management facility; a disaster management sub-system having a control function of conducting centralized supervision by displaying information about components installed in the urban underground tunnels in the metaverse space and recording a situation; and a network sub-system configured to provide the virtual space to a user terminal of an external inspector.

13 Claims, 8 Drawing Sheets

(51) Int. Cl.
*G06T 19/00* (2011.01)
*H04W 4/80* (2018.01)

(58) Field of Classification Search
CPC .... H04M 1/72424; H04L 67/12; G08B 21/02; G08C 17/02; G08C 2201/42
USPC ...................................................... 455/404.1
See application file for complete search history.

(56) References Cited

U.S. PATENT DOCUMENTS

2018/0159756 A1\* 6/2018 Matthews ............... H04L 67/02
2022/0036302 A1\* 2/2022 Cella .................. G06Q 10/0834

\* cited by examiner

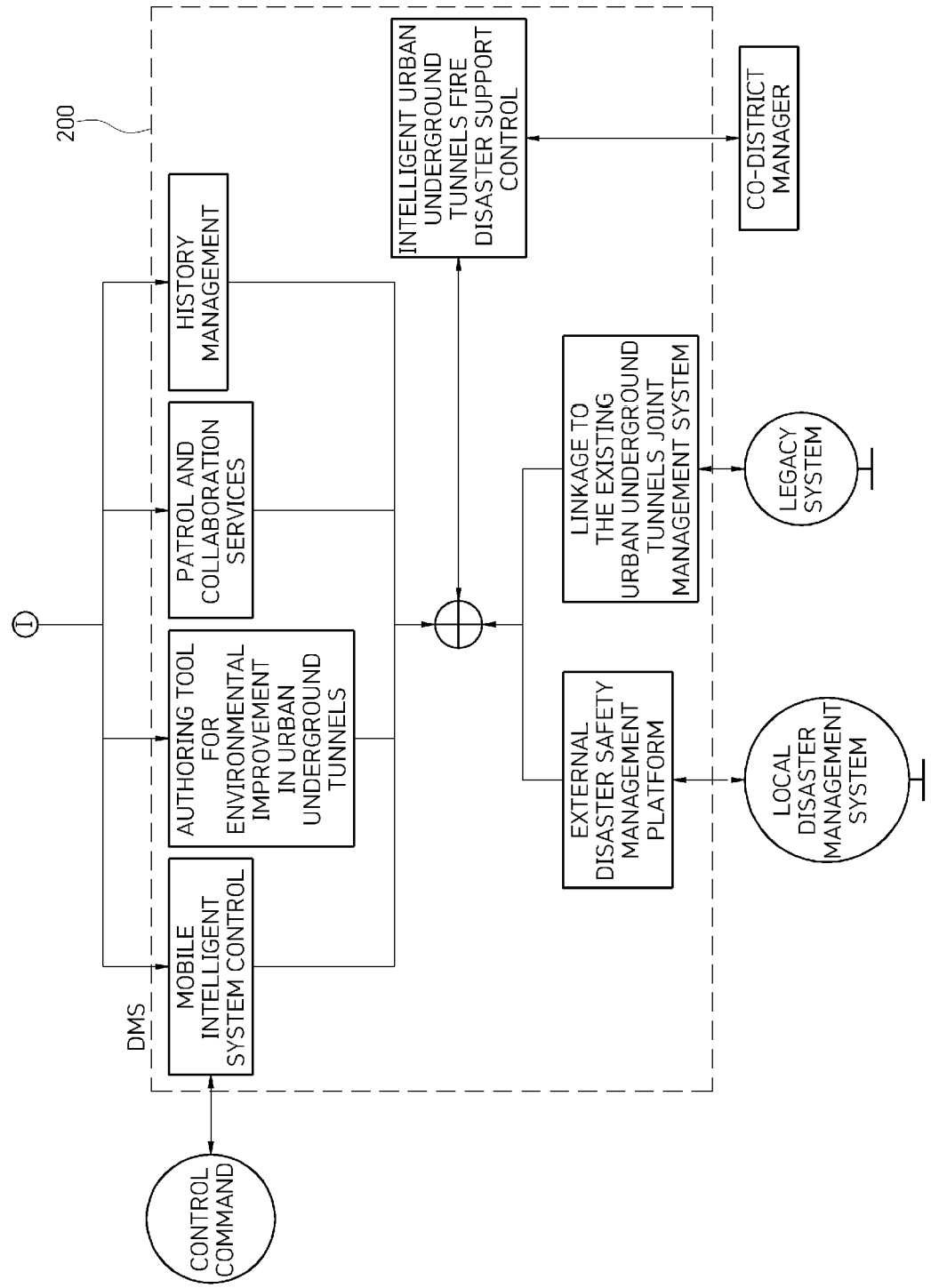

DIGITAL TWIN DISASTER MANAGEMENT SYSTEM CUSTOMIZED FOR UNDERGROUND PUBLIC AREAS

CROSS-REFERENCE TO RELATED APPLICATIONS

This application claims priority to and the benefit of Korean Patent Application No. 10-2020-0158723, filed on Nov. 24, 2020, and Korean Patent Application No. 10-2021-0102082, filed on Aug. 3, 2021, the disclosure of which is incorporated herein by reference in its entirety.

BACKGROUND

1. Field of the Invention

The present disclosure relates to a service for conducting real-time situation management in an urban underground tunnels and conducting early prediction and a prior preparation when a disaster occurs inside or outside the urban underground tunnels.

2. Description of Related Art

Urban underground tunnels provide an urban lifeline and an infrastructure necessary for people's lives. The urban lifeline refers to city-based facilities such as a communication facilities, a power supply, a water supply/treated water supply, a heating facilities, and a garbage transport pipe, which are managed in an underground space, includes a 24-hour patrol and monitoring system to maintain the functions of an urban lifeline directly related to citizens, and performs continuous maintenance.

A technique therefor merely provides a service related to monitoring and managing facilities in an underground space and facilities of private-use organizations corresponding to the urban lifeline.

In the related art related to such a monitoring and managing service, information technology (IT) equipment such as a sensor and a closed-circuit TV (CCTV) is simply used for the purpose of monitoring statuses of facilities to manage main systems of facilities in public areas and subsidiary facilities, provide a visitor control service, and support daily inspection, and only whether a fire occurs is monitored in relation to a disaster.

However, a situation is only recognized after the occurrence of a disaster, and thus the disaster cannot be sufficiently prepared for. Damage due to the disaster may be reduced when the disaster can be prevented and prepared for in advance before the occurrence of the disaster.

Recently, as awareness about disasters and disaster management technology is becoming more advanced, preparation for complex and uncertain disasters are considered as important and thus technologies and services therefor are required.

In existing monitoring and management technologies for dealing with a disaster occurring in an urban underground tunnels, only a ventilation device, an infrared access sensor, a video surveillance device, an automatic fire extinguishing device, and a heat sensor are used, and IT devices are used only to monitor security and the scale of a disaster.

As such, the existing systems are mainly used to detect whether a disaster occurs and request a related organization to immediate deal with the disaster.

In addition, in order to deal with a disaster situation, a situation room is operated and managed, in which a multi-screen is used for a monitoring purpose. However, only status information of various types of sensors, a status of an alarm, and whether the alarm is disabled can be displayed on the multi-screen to respond to the disaster situation, and thus, quickly responding to an abnormal and disaster is limited due to a lack of information such as accurate location information of a place where a disaster has occurred, a response scale, an accurate analysis of a disaster situation, a prediction about the spread of the disaster, a degree of risk due to the spread of the disaster, real-time disaster status information, etc.

SUMMARY OF THE INVENTION

To address the above-described problems of the related art, the present disclosure is directed to providing a digital twin disaster management system customized for urban underground tunnels, in which a virtual space identical to an urban underground tunnels is built and a simulation is conducted in advance in the virtual space to predict whether a minor abnormal situation that cannot be realized in a real environment leads to the spread of a disaster, thereby preventing a disaster or responding to an abnormal and disaster at an early stage.

The present disclosure is directed to providing a digital twin disaster management system customized for urban underground tunnels, which is capable of preparing, in advance, for a disaster situation, which may occur in an urban underground tunnels, on the basis of a basic technique, providing real-time field supervision optimized to identify many warnings before the occurrence of a disaster, and handling a disaster.

Aspects of the present disclosure are not limited thereto and other aspects not described herein will be clearly understood by those of ordinary skill in the art from the following description.

According to an aspect of the present disclosure, a digital twin disaster management system customized for urban underground tunnels includes a sensor sub-system (SSS) configured to detect environmental information, status information and image information in the urban underground tunnels, a digital twin model management sub-system (TMS) configured to create and update a virtual space corresponding to the urban underground tunnels using informations provided from the sensor sub-system and 3D space, insert various types of attributes into the virtual space, detect tagging information, predict the spread of each disaster, and infer a degree of risk of a management facilities, a disaster management sub-system (DMS) having a control function of conducting centralized supervision by displaying information about components installed in the urban underground tunnels in the metaverse space and recording a situation, and a network sub-system (NSS) configured to provide the created virtual space to a user terminal of an external inspector.

The sensor sub-system may include a fixed convergence sensor function processor with sensors fixedly installed at arbitrary positions in the urban underground tunnels.

The sensors may include at least one of sensors configured to detect informations lie temperature, humidity, oxygen, carbon dioxide, nitrogen, smoke, and flame.

The sensors may include at least one of an sensor, a Bluetooth low energy (BLE) sensor, a radio-frequency identification (RFID) sensor, and a vibration sensor.

The sensor sub-system may include a mobile intelligent sensor processor including the sensors and configured to move within the urban underground tunnels.

The sensor sub-system may include an image sensor function processor configured to obtain image information, such as a red/green/blue (RGB) camera, a thermal imaging camera, a low-light-level camera, and a LiDAR.

The disaster management sub-system may include a mobile intelligent robot management function processor configured to control overall operations of a mobile intelligent robot installed in the urban underground tunnels and manage a status of the mobile intelligent robot; and a common status management function processor configured to display all of normal and abnormal of a facility accommodated in the urban underground tunnels and the management facility in real time in the metaverse space so as to allow a field agent or a worker in the control and management room to recognize a situation in real time.

The disaster management sub-system may further include a disaster model and simulation function processor configured to derive a model corresponding to an abnormal and disaster situation when a situation occurs, perform a prediction simulation function through a prediction model of the derived model, and guide to handle the disaster on the basis of a result of performing the prediction simulation function.

The digital twin model management sub-system may include a 3D spatial model generation and management function processor configured to create and manage a virtual space corresponding to the urban underground tunnels from the image information provided from the sensor sub-system; a 3D spatial model update function processor configured to detect whether a model of the virtual space deforms and update an initial model of the virtual space when the model of the virtual space is modified or a model of the virtual space is added; a risk management and decision supporting function processor configured to calculate a degree of risk of an object to be managed in the urban underground tunnels by analyzing information collected in the field and predictive disaster spread information; and a digital twin model generation and management function processor configured to create a disaster model by applying disaster information to the virtual space corresponding to the urban underground tunnels and provide the created disaster model to an user terminal in the control and management room.

The urban underground tunnels may include at least one of a spatial structure, an accommodated facilities, sensors, a network facility, the management facility and an illumination facility.

The risk management and decision supporting function processor may calculate a degree of risk of the spread of a disaster when the disaster occurs by identifying a degree of the spread of the disaster through analyzing of information about a result of a simulation conducted by inputting information collected and analyzed through step-by-step disaster management to an abnormal and disaster spread model (e.g., a fire spread model).

The risk management and decision supporting function processor may use the calculated degree of risk of the disaster diffusion and the extraction for decision making information.

The risk management and decision supporting function processor may calculate a degree of risk periodically or in real time.

The network sub-system may first transmit and receive data through a wired network and transmit and receive data through a wireless network when an obstacle occurs in the wired network.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 7A to 7E is a reference diagram for describing an operation of a digital twin disaster management system customized for urban underground tunnels according to an embodiment of the present disclosure.

DETAILED DESCRIPTION OF EXEMPLARY EMBODIMENTS

Advantages and features of the present disclosure and methods of achieving them will be apparent from embodiments described in detail in conjunction with the accompanying drawings. However, the present disclosure is not limited to the embodiments set forth herein and may be embodied in many different forms. The embodiments are merely provided so that this disclosure will be thorough and complete and will fully convey the scope of the present disclosure to those of ordinary skill in the art. The present disclosure should be defined by the scope of claims. The terminology used herein is for the purpose of describing embodiments only and is not intended to be limiting of the present disclosure. As used herein, singular forms are intended to include plural forms unless the context clearly indicates otherwise. As used herein, the terms "comprise" and/or "comprising" specify the presence of stated components, steps, operations and/or elements but do not preclude the presence or addition of one or more other components, steps, operations and/or elements.

Figure 1:
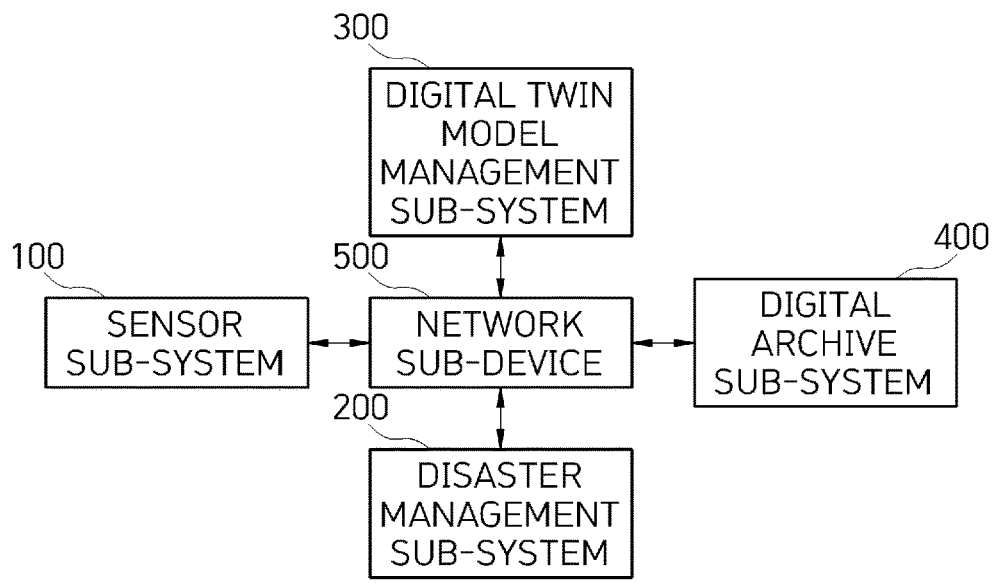
FIG. 1 is a block diagram illustrating a digital twin disaster management system customized for urban underground tunnels according to an embodiment of the present disclosure.

FIG. 1 is a block diagram illustrating a digital twin disaster management system customized for urban underground tunnels according to an embodiment of the present disclosure.

As shown in FIG. 1, the digital twin disaster management system customized for urban underground tunnels according to the embodiment of the present disclosure includes a sensor sub-system 100, a disaster management sub-system 200, a digital twin model management sub-system 300, a digital archive sub-system 400, and a network sub-system 500.

Figure 2:
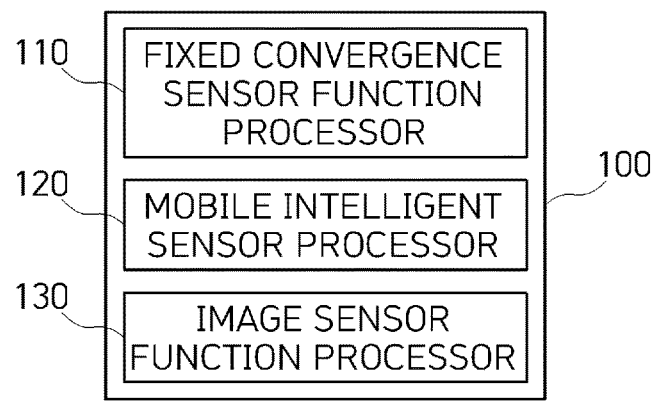
FIG. 2 is a block diagram for describing a detailed configuration of a sensor sub-system of FIG. 1.

As shown in FIG. 2, the sensor sub-system 100 includes a fixed convergence sensor function processor 110, a mobile intelligent sensor processor 120, and an image sensor function processor 130.

Figure 3:
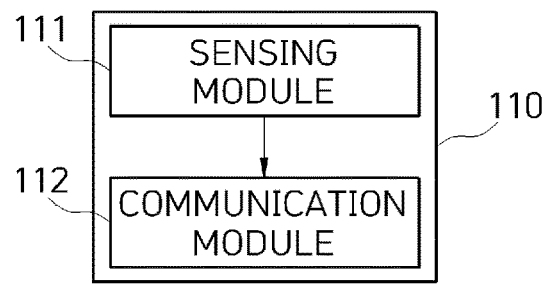
FIG. 3 is a block diagram for describing a configuration of a function processor of FIG. 2.

As shown in FIG. 3, the fixed convergence sensor function processor 110 includes a sensing module 111 for obtaining disaster information and a communication module 112 for transmitting disaster information detected by the sensing module 111.

The fixed convergence sensor function processor 110 is fixedly installed at an arbitrary position in urban underground tunnels to detect environmental information in the urban underground tunnels.

The mobile intelligent sensor processor 120 detects environmental information while moving within the urban underground tunnels. The mobile intelligent sensor processor 120 may be a mobile intelligent robot with a sensor that provides image information or detects environmental information while moving in the urban underground tunnels. The mobile intelligent robot may include a sensor that includes at least one of sensors, a Bluetooth low energy (BLE) sensor, a radio-frequency identification (RFID) sensor, and a vibration sensor.

The image sensor function processor 130 obtains image information, like a red/green/blue (RGB) camera, a thermal imaging camera, a low-light-level (LLL) camera, and a LiDAR. The image sensor function processor 130 may be installed in the mobile intelligent sensor processor 120.

As shown in FIG. 3, the fixed convergence sensor function processor 110, the mobile intelligent sensor processor 120, and the image sensor function processor 130 may include a plurality of sensing modules 111 including at least one of sensors for detecting temperature, humidity, oxygen, carbon dioxide, nitrogen, smoke, and flame, and a communication module 112 that transmits or receives such detected information.

The disaster management sub-system 200 manages all situations in an administration center and has a control function of conducting centralized supervision by displaying information about components in the urban underground tunnels in the metaverse space and recording situations.

Figure 4:
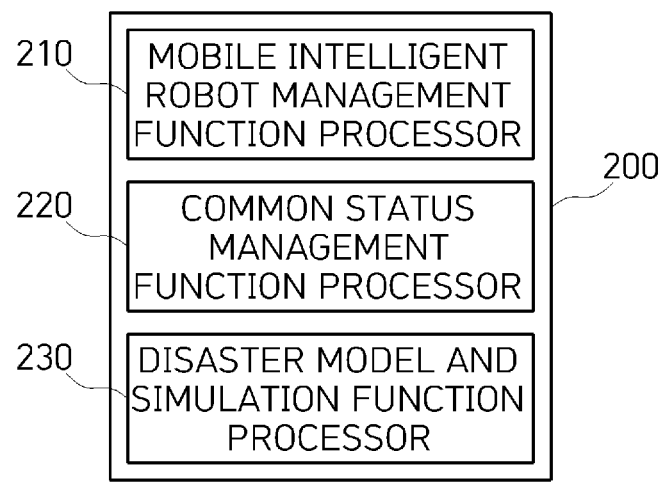
FIG. 4 is a block diagram for describing a detailed configuration of a disaster management sub-system of FIG. 1.

As shown in FIG. 4, the disaster management sub-system 200 includes a mobile intelligent robot management function processor 210, a common status management function processor 220 and a disaster model and simulation function processor 230.

The mobile intelligent robot management function processor 210 controls overall operations of the mobile intelligent sensor processor 120, which is a mobile intelligent robot, provided in the urban underground tunnels and manages a status of the mobile intelligent sensor processor 120.

The common status management function processor 220 displays all of normal and abnormal of facilities accommodated in the urban underground tunnels and management facilities in real time in the metaverse space so that a field agent or a worker in the control and management room may recognize a situation in real time.

The disaster model and simulation function processor 230 derives a model corresponding to an abnormal and disaster situation when a situation occurs, performs a prediction simulation function through a prediction model of the derived model, and guides to handle the disaster on the basis of a result of performing the prediction simulation function.

The digital twin model management sub-system 300 creates spatial information of the urban underground tunnels in which the sensor sub-system 100 is installed, updates the spatial information, inserts various types of attributes into the spatial information, detects tagging information, predicts the spread of each disaster, and estimates a degree of risk of a management facility.

Figure 5:
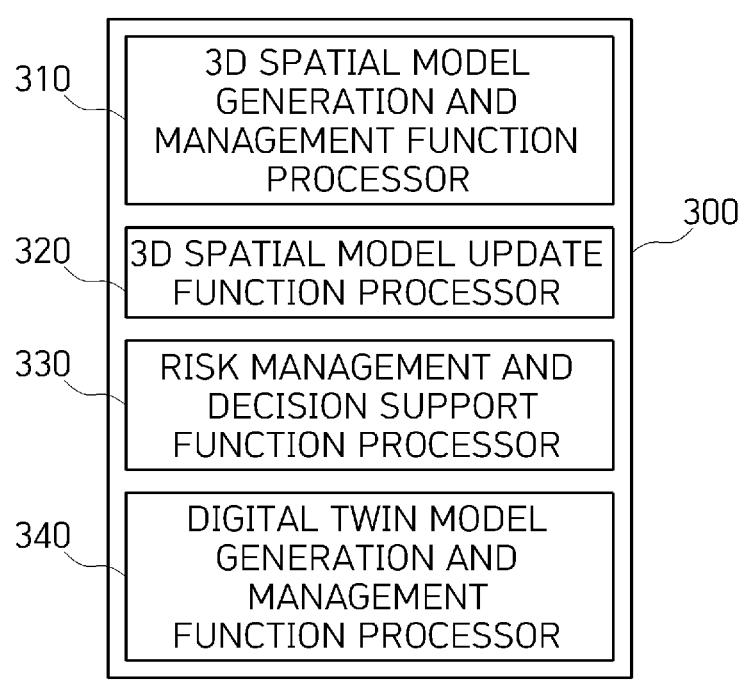
FIG. 5 is a block diagram for describing a detailed configuration of a digital twin model management sub-system of FIG. 1.

To this end, as shown in FIG. 5, the digital twin model management sub-system 300 includes a 3D spatial model generation and management function processor 310, a 3D spatial model update function processor 320, a risk management and decision supporting function processor 330, and a digital twin model generation and management function processor 340.

The spatial model generation and management function processor 310 creates a digital twin model, which is a 3D spatial model of the urban underground tunnels using image information of the urban underground tunnels provided from the sensor sub-system 100, and manages all objects to be created in the urban underground tunnels. Here, all the objects include one or more of spatial structures, accommodated facilities, sensors, network facilities, management facilities, and illumination facilities. In this case, an operation of tagging all the objects may be further performed.

The spatial model update function processor 320 searches for a created digital twin model at a high speed to detect whether the created spatial model deforms, and updates an initial spatial model, i.e., reconstructs the digital twin model, when the spatial model is modified or a 3D spatial model is added.

The risk management and decision supporting function processor 330 analyzes information collected in the field with respect to a component for which risk management should be performed among components constituting a public area (an accommodated facility or a management facility) to be managed so as to analyze a simulation result related to an abnormal and disaster spread prediction model and calculate a degree of risk.

The risk management and decision supporting function processor 330 detects an abnormal situation using environmental information, status information and image information detected by the sensor sub-system 100.

In the present embodiment, the risk management and decision supporting function processor 330 may calculate a degree of risk periodically or in real time.

In order to identify a risk such as the spread of a disaster when the disaster occurs, the risk management and decision supporting function processor 330 analyzes materials of facilities installed in the public area and images and audio information collected from sensors in the field, and extracts an input value of a disaster spread prediction model. First, environmental information ($CO$, $CO_2$, $O_2$, etc.), image information, and audio information are collected from sensors installed in the field in the public area. The possibility of a fire is determined by analyzing the environmental information that changes rapidly due to toxic gas generated due to combustion when a disaster occurs. The image information is analyzed to recognize an object such as flame or spark associated with a fire, and the audio information is analyzed to extract information about a situation associated with a fire in a closed area occurring in the image information. A virtual simulation is conducted by extracting an input value of a model for prediction of the spread of a fire from the analyzed information. Information obtained through the virtual simulation is analyzed to determine whether a fire has occurred and the possibility of the spread of the fire. Based on the analyzed information of the virtual simulation, the seriousness of a situation currently occurring in a public area is determined by inferring a degree of risk at each stage on the basis of a predetermined policy.

For example, it is determined whether a caution level, which is a level of risk, is to be raised to an alert level by determining, through a simulation, whether a fire is continuously spreading or is temporarily spreading in a certain section on the basis of input material and strength of a place where flame is generated.

A degree of risk of the spread of a disaster may be calculated as described above and used for decision making.

In this case, a fire disaster model and a simulation disaster training may be evaluated, a unit damage may be evaluated, and a response scale may be inferred.

The digital twin model generation and management function processor 340 creates and manages a model reflecting a real feature in the urban underground tunnels and provides the managed model to an user terminal in the control and management room 600. That is, the digital twin model generation and management function processor 340 provides a reconstructed digital twin model to the user terminal 600 of an external field member, i.e., an inspector, so that the inspector may visualize a digital twin model customized for the field.

The digital archive sub-system 400 stores information produced and processed in a sub-system.

Figure 6:
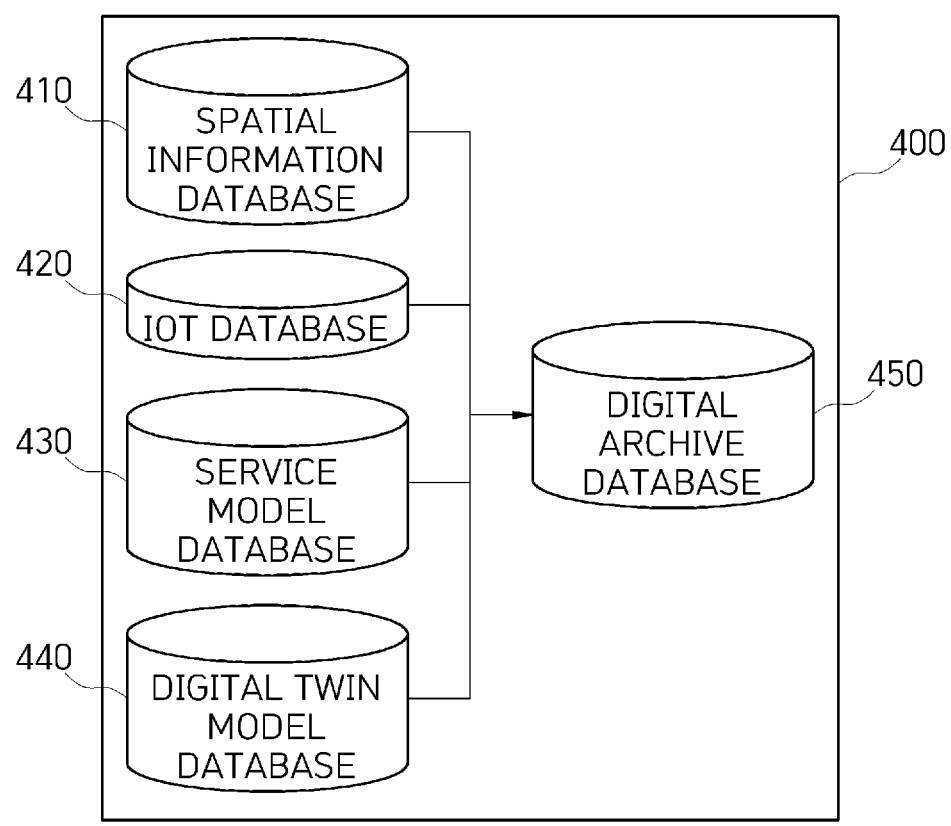
FIG. 6 is a block diagram for describing a detailed configuration of a digital archive sub-system of FIG. 1.
Figure 7A:
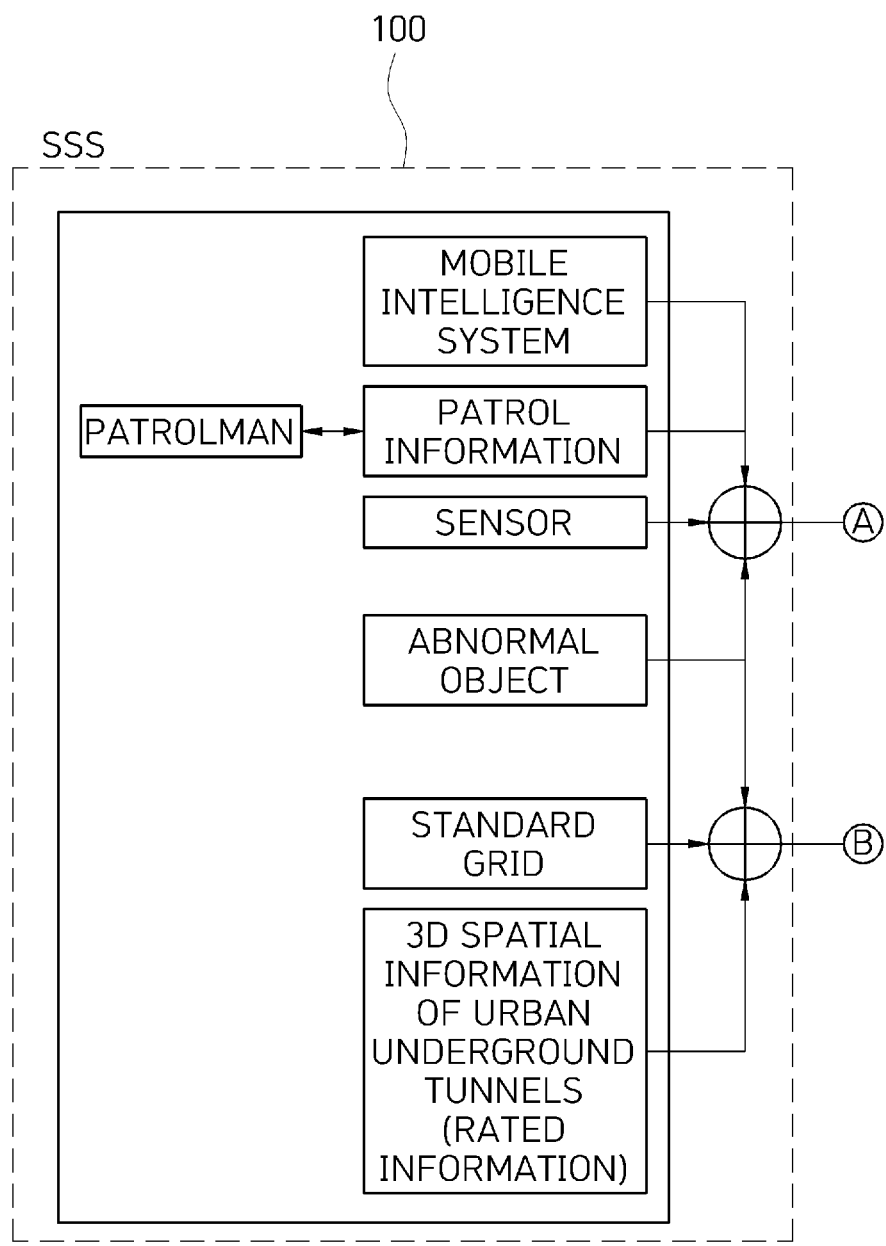
Figure 7B:
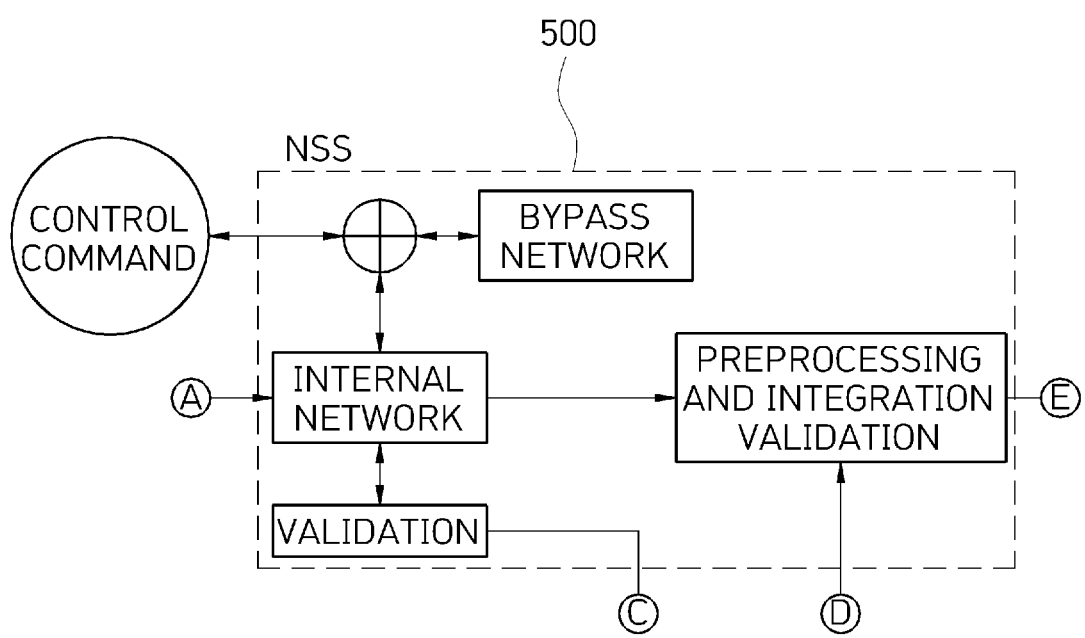
Figure 7C:
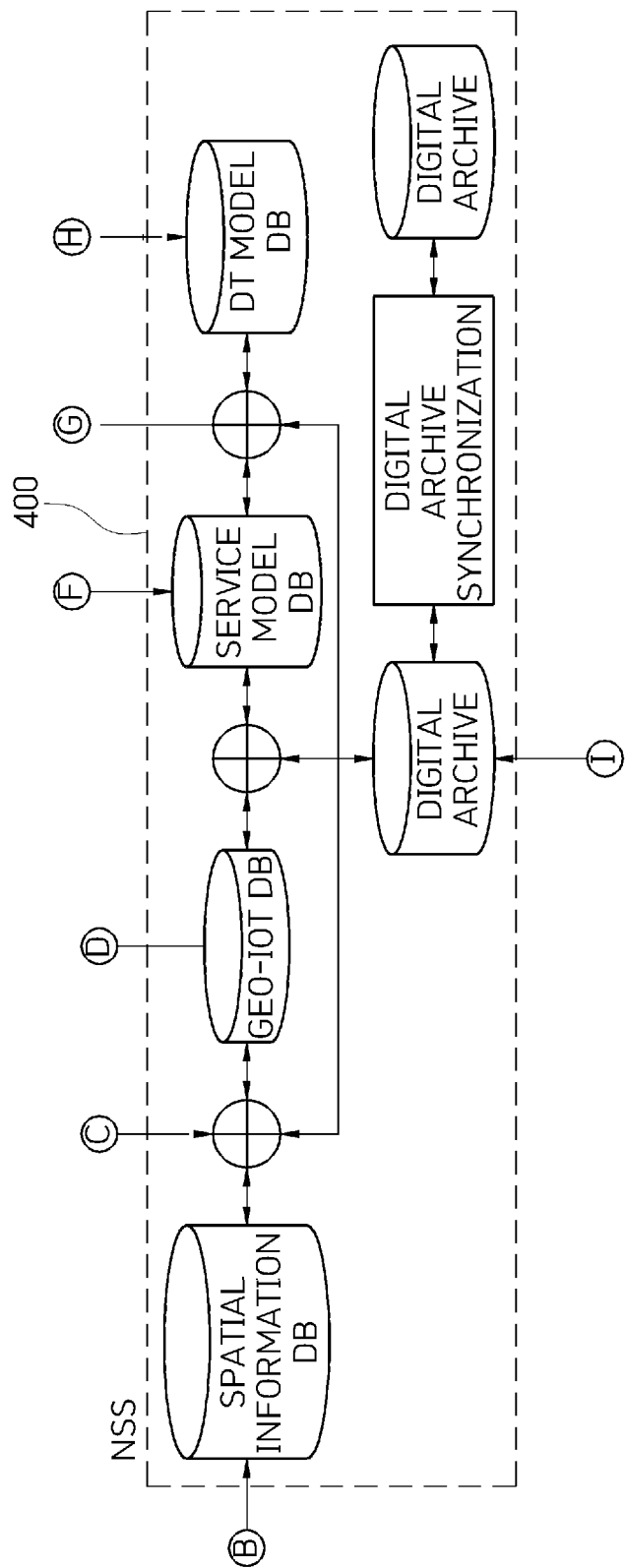
Figure 7D:
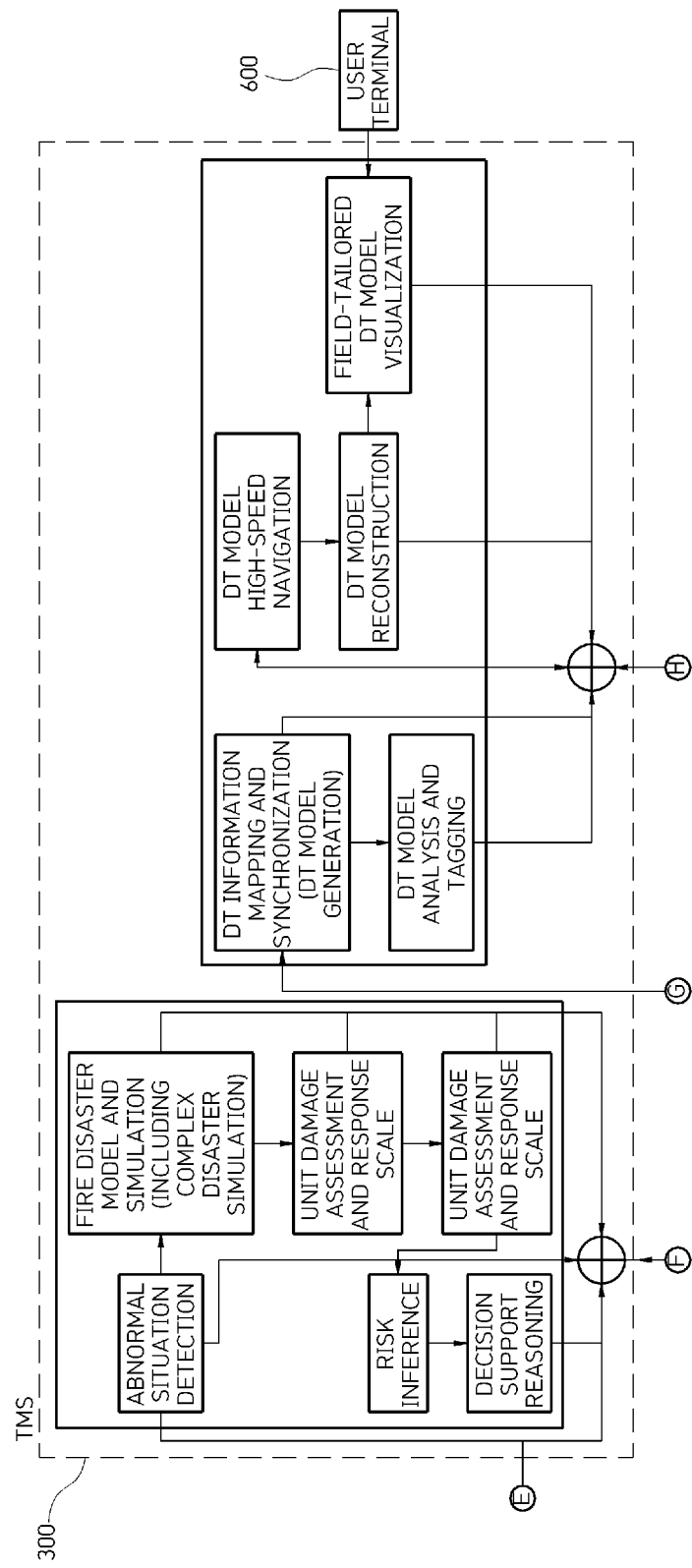

To this end, as shown in FIG. 6, the digital archive sub-system 400 includes a spatial information database 410, an Internet-of-Things (IoT) database 420, a service model database 430, a digital twin model database 440, and a digital archive database 450 for integrating and managing information stored in these databases.

The spatial information database 410 stores environmental information, status information and image information collected from the sensor sub-system 100.

The IoT database 420 stores IoT information and status information of components installed in an urban underground tunnels.

The service model database 430 stores abnormal situation sensing information in the urban underground tunnels, risk degree inference information, decision support inference information, a fire disaster model, simulation decision information, a unit disaster evaluation, and response scale inference information.

The digital twin model database 440 stores information about a digital twin model created by the digital twin model management sub-system 300, an analysis of the digital twin model, tagging information, information about a reconstructed digital twin model, and information about a visualized digital twin model customized for the field.

The digital archive database 450 is further provided to integrate and manage the information stored in these databases.

The network sub-system 500 communicates with the user terminal 600 that an external inspector is wearing and an external disaster management system of a local government. The network sub-system 500 first transmits and receives data through a wired network and transmits and receives data through a wireless network when an obstacle occurs in the wired network.

The external inspector is able to experience a virtual space identical to the urban underground tunnels using the created digital twin model.

Therefore, according to an embodiment of the present disclosure, it is possible to achieve an effect of conducting a pre-simulation of the spread and prediction of a disaster, which cannot be performed in a real-world environment, in the virtual space.

A process of operating a digital twin disaster management system customized for urban underground tunnels according to an embodiment of the present disclosure will be described with reference to FIGS. 7A to 7E.

Spatial information in the urban underground tunnels is captured and obtained by the image sensor function processor 130 of the sensor sub-system 100 and provided to the digital twin model management sub-system 300 through the network sub-system 500.

In this case, the digital twin model management sub-system 300 creates a 3D spatial model of the urban underground tunnels using image information of the urban underground tunnels provided from the sensor sub-system 100.

The created spatial model of the urban underground tunnels is modeled by the network sub-system 500 and provided to the user terminal 600 outside the urban underground tunnels.

Thus, an inspector of the urban underground tunnels may be provided with a virtual space identical to the urban underground tunnels through the user terminal 600.

In addition, the sensor sub-system 100 provides environmental information, such as temperature, humidity, oxygen, carbon dioxide, nitrogen, smoke, and flame, which is obtained through the sensors of the fixed convergence sensor function processor 110 fixedly installed at an arbitrary position on the urban underground tunnels, to the digital twin model management sub-system 300 through the network sub-system 500.

In this case, the digital twin model management sub-system 300 updates the environmental information provided to a previously created virtual space and provides the updated environmental information to the user terminal 600 through the network sub-system 500.

Accordingly, the inspector may be provided with a visualization of the virtual space of the urban underground tunnels through the user terminal 600 and provided with a visualization of environmental information, which is generated in the actual urban underground tunnels, in the virtual space and thus may be able to inspect the urban underground tunnels without having to visit the urban underground tunnels.

The sensor sub-system 100 provides the disaster management sub-system 200 with environmental information in the urban underground tunnels detected by the fixed convergence sensor function processor 110 and image information obtained by the image sensor function processor 130, and the digital twin model management sub-system 300 provides information about the created virtual space to the disaster management sub-system 200.

As described above, the disaster management sub-system 200 has a control function of conducting centralized supervision by displaying information about components in the urban underground tunnels in the metaverse space and recording situations using the provided environmental information and the information about the virtual space.

When the inspector's user terminal 600 is connected to the sensor sub-system 100 through the network sub-system 500, the user terminal 600 is operated in connection with the mobile intelligent sensor processor 120 of the sensor sub-system 100.

Therefore, when the inspector is moving on the ground above the urban underground tunnels, the mobile intelligent sensor processor 120 is also moving in a moving direction of the user terminal 600. In this case, the mobile intelligent sensor processor 120 includes the image sensor function processor 130 to provide the user terminal 600 with a virtual space matching the inspector's movement.

Therefore, the inspector may experience an environment identical to that in the urban underground tunnels without having to visit the urban underground tunnels.

The disaster management sub-system 200 may provide the digital twin model management sub-system 300 with a disaster model and information about a simulation of the disaster model through the simulation function processor 230 so as to prepare for a disaster in the urban underground tunnels in advance.

In this case, the digital twin model management subsystem 300 generates a virtual disaster in the virtual space created through the disaster management sub-system 200 and provides the virtual disaster to the user terminal 600 of the inspector located on the ground above the urban underground tunnels.

Therefore, the inspector may be trained with preparation of a virtual disaster according to the virtual disaster provided by the disaster management sub-system 200.

As described above, according to an embodiment of the present disclosure, pre-disaster preparation information for urban underground tunnels can be analyzed and provided in real time, a first action against a disaster can be taken before the arrival of a rescue team when the disaster occurs, and predictive disaster spread information can be obtained to prevent the spread of the disaster.

Therefore, a disaster occurrence rate can be significantly reduced in ordinary times through a pre-disaster preparation, a disaster can be effectively handled before the arrival of a rescue team when the disaster occurs, and relevant information can be shared between persons concerned and interested parties, thereby minimizing damage due to the disaster.

According to an embodiment of the present disclosure, pre-disaster preparation information for urban underground tunnels can be analyzed and provided in real time, a first action against a disaster can be taken before the arrival of a rescue team when the disaster occurs, and predictive disaster spread information can be obtained to prevent the spread of the disaster.

Therefore, a disaster occurrence rate can be significantly reduced in ordinary times through a pre-disaster preparation, a disaster can be effectively handled before the arrival of a rescue team when the disaster occurs, and relevant information can be shared between persons concerned and interested parties, thereby minimizing damage due to the disaster.

Each step included in the learning method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While the configurations of the present disclosure have been described above in detail with reference to the accompanying drawings, the configurations are merely examples and various modifications and changes may be made therein within the scope of the present disclosure by those of ordinary skill in the technical field to which the present disclosure pertains. Therefore, the scope of the present disclosure is not limited to the aforementioned embodiments and should be defined by the following claims.

What is claimed is:

1. A digital twin disaster management system customized for urban underground tunnels, comprising:
    a sensor sub-system configured to detect environmental information, status information and image information in the urban underground tunnels;
    a digital twin model management sub-system configured to create and update a virtual space corresponding to the urban underground tunnels using the image information provided from the sensor sub-system, insert various types of attributes into the virtual space, detect tagging information, predict spread of each disaster, and infer a degree of risk of a management facility;
    a disaster management sub-system having a control function of conducting centralized supervision by displaying information about components installed in the urban underground tunnels in a multi-screen and recording situations; and
    a network sub-system configured to provide the created virtual space to a user terminal of an external inspector,
    wherein the sensor sub-system comprises a fixed convergence sensor function processor including sensors fixedly installed at arbitrary positions in the urban underground tunnels.

2. The digital twin disaster management system of claim 1, wherein the sensors comprise at least one of sensors configured to detect informations on temperature, humidity, oxygen, carbon dioxide, nitrogen, smoke, and flame in urban underground tunnels.

3. The digital twin disaster management system of claim 1, wherein the sensors comprise at least one of an ultrasonic sensor, a Bluetooth low energy (BLE) sensor, a radio-frequency identification (RFID) sensor, and a vibration sensor.

4. The digital twin disaster management system of claim 1, wherein the sensor sub-system comprises a mobile intelligent sensor processor including sensors and configured to move within the urban underground tunnels.

5. The digital twin disaster management system of claim 1, wherein the sensor sub-system comprises an image sensor function processor configured to obtain image information, wherein the image sensor function processor comprises a red/green/blue (RGB) camera, a thermal imaging camera, a low-light-level camera, and a LiDAR.

6. A digital twin disaster management system customized for urban underground tunnels, comprising:
a sensor sub-system configured to detect environmental information, status information and image information in the urban underground tunnels;
a digital twin model management sub-system configured to create and update a virtual space corresponding to the urban underground tunnels using the image information provided from the sensor sub-system, insert various types of attributes into the virtual space, detect tagging information, predict spread of each disaster, and infer a degree of risk of a management facility;
a disaster management sub-system having a control function of conducting centralized supervision by displaying information about components installed in the urban underground tunnels in a multi-screen and recording situations; and
a network sub-system configured to provide the created virtual space to a user terminal of an external inspector,
wherein the disaster management sub-system comprises:
a mobile intelligent robot management function processor configured to control overall operations of a mobile intelligent robot installed in the urban underground tunnels and manage a status of the mobile intelligent robot; and
a common status management function processor configured to display all of normal and abnormal of a facility accommodated in the urban underground tunnels and the management facility in real time on the multi-screen so as to allow a field agent or a worker in the control and management room to recognize situations in real time.

7. The digital twin disaster management system of claim 6, wherein the disaster management sub-system further comprises a disaster model and simulation function processor configured to derive a model corresponding to an abnormal and disaster situation when a situation occurs, perform a prediction simulation function through a prediction model of the derived model, and guide to handle the disaster on the basis of a result of performing the prediction simulation function.

8. A digital twin disaster management system customized for urban underground tunnels, comprising:
a sensor sub-system configured to detect environmental information, status information and image information in the urban underground tunnels;
a digital twin model management sub-system configured to create and update a virtual space corresponding to the urban underground tunnels using the image information provided from the sensor sub-system, insert various types of attributes into the virtual space, detect tagging information, predict spread of each disaster, and infer a degree of risk of a management facility;
a disaster management sub-system having a control function of conducting centralized supervision by displaying information about components installed in the urban underground tunnels in a multi-screen and recording situations; and
a network sub-system configured to provide the created virtual space to a user terminal of an external inspector,
wherein the digital twin model management sub-system comprises:
a 3D spatial model generation and management function processor configured to create and manage a virtual space corresponding to the urban underground tunnels from the image information provided from the sensor sub-system;
a 3D spatial model update function processor configured to detect whether a model of the virtual space deforms and update an initial model of the virtual space when the model of the virtual space is modified or a model of the virtual space is added;
a risk management and decision supporting function processor configured to calculate a degree of risk of an object to be managed in the urban underground tunnels by analyzing information collected in the field and predictive disaster spread information; and
a digital twin model generation and management function processor configured to create a disaster model by applying disaster information to the virtual space corresponding to the urban underground tunnels and provide the created disaster model to an user terminal in the control and management room.

9. The digital twin disaster management system of claim 1, wherein the urban underground tunnels comprises at least one of a spatial structure, an accommodated facilities, sensors, a network facility, the management facility and an illumination facility.

10. The digital twin disaster management system of claim 8, wherein the risk management and decision supporting function processor calculates a degree of risk by analyzing a risk of the disaster diffusion using a result of a virtual simulation of a predictive disaster spread model when the disaster occurs.

11. The digital twin disaster management system of claim 10, wherein the risk management and decision supporting function processor uses the calculated degree of risk of the disaster diffusion and the extraction for decision making information.

12. The digital twin disaster management system of claim 1, wherein the risk management and decision supporting function processor calculates a degree of risk periodically or in real time.

13. The digital twin disaster management system of claim 1, wherein the network sub-system first transmits and receives data through a wired network and transmits and receives data through a wireless network when an obstacle occurs in the wired network.

* * * * *